April 17, 1928.  M. NORMAN  1,666,106
SPOON
Filed Jan. 3, 1927
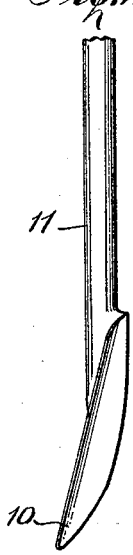
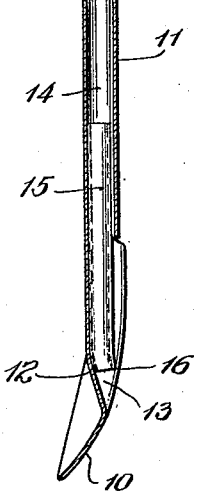
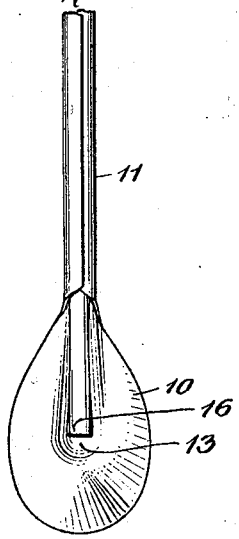
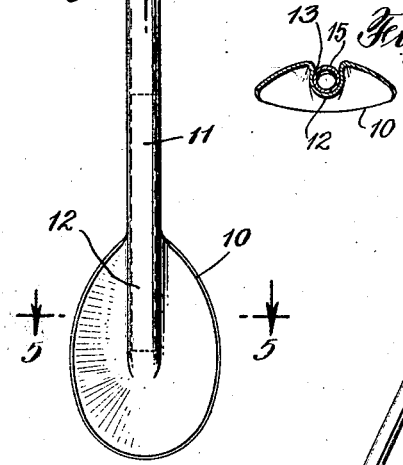
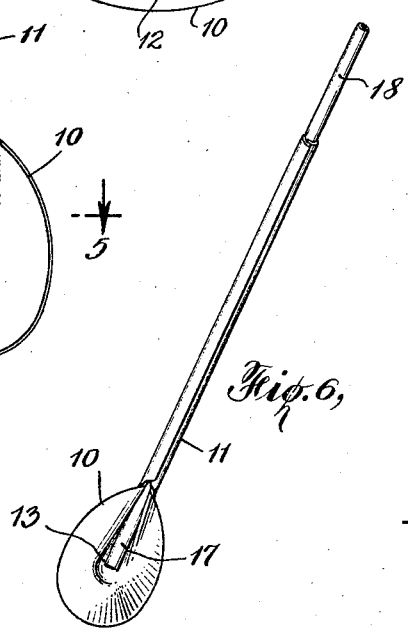
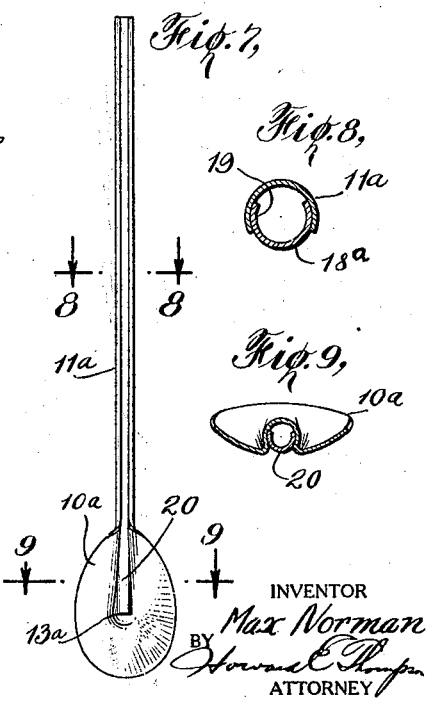
INVENTOR
Max Norman
BY
ATTORNEY Patented Apr. 17, 1928.

1,666,106

UNITED STATES PATENT OFFICE.

MAX NORMAN, OF BROOKLYN, NEW YORK.

SPOON.

Application filed January 3, 1927. Serial No. 158,479.

This invention relates to spoons and particularly to devices of this class composed of paper, fibre or similar non-metallic material; and the object of the invention is to provide a spoon of the class specified, which is designed primarily for use in connection with ice cream sodas and the like, said spoon comprising a head portion and an elongated handle portion, the handle portion being of sufficient length to extend above the top of a tall glass such as used in serving ice cream sodas and the like; a further object being to provide a spoon of the class described, the handle portion of which is tubular in form to permit of the transmission of fluid from a glass or container to the mouth, by applying the mouth to the upper end of the handle of the spoon; a further object being to provide a spoon of the class specified in the handle portion of which is mounted a straw which extends into a grooved portion on the under face of the head of the spoon whereby liquid may be transmitted from the lower portion of the spoon through said handle portion and the straw therein; and with these and other objects in view, the invention consists in a spoon of the class and for the purpose specified, which is preferably constructed from stiff and strong fibrous material, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a face view of one form of spoon made according to my invention.

Fig. 2 is a side view of the lower end portion thereof.

Fig. 3 is a section on the line 3—3 of Fig. 1.

Fig. 4 is a rear view of the spoon as seen in Figs. 2 and 3.

Fig. 5 is a section on the line 5—5 of Fig. 1.

Fig. 6 is a rear view of a modified form of spoon.

Fig. 7 is a rear view of another form of spoon which I may employ.

Fig. 8 is a section on the line 8—8 of Fig. 7 on an enlarged scale; and

Fig. 9 is a section on the line 9—9 of Fig. 7.

The spoon herein shown, described and claimed is an improvement on that disclosed in prior patents granted to me, November 9, 1926, and bearing Numbers 1,606,038 and 1,606,039. In the structure shown in Figs. 1 to 5 inclusive, I have shown a spoon comprising a head portion 10 of conventional form. Formed integral with the head portion 10 is a tubular handle portion 11 which joins the head portion in a rib 12 forming a groove and recess 13 on the under or rear face of the head 10. It will be understood that the rib 12 gives strength and rigidity to the spoon where the handle portion 11 joins the head 10. It will be understood that the head and handle portions of the spoon are made from a flat sheet which is pressed into the desired form and fashioned to form the tubular handle portion 11, the ends of the sheet from which the handle portion 11 is formed being secured together to form a sealed tube in any desired manner, forming a bore passage 14 from the upper end of the handle portion 11 to the lower end thereof where it opens into the groove 13.

In order to extend the bore 14 to the lowermost end of the groove 13, I mount in the lower end of the bore 14, a tubular member 15 which extends into the groove 13 and terminates at 16. The short tube 15 may be of any desired construction and composed of any suitable material, and for example, a short piece of straw of conventional form may be employed. By the use of the tube 15, the liquid in a glass or other container may be drawn through the tubular handle 11 by suction through the mouth to remove substantially all of the liquid of a container, especially when tilted to a slight degree.

In the construction of the spoon, I may employ any suitable non-metallic material, but preferably one which will render the construction of the spoon inexpensive in that the spoon is to be discarded when used in the manner of the use of what are known as straws. I prefer to construct the spoon of a presser fibre board having stiff or rigid properties, whereby a comparatively thin sheet may be employed, and when shaped in the manner shown and described, will produce a strong and durable structure.

In Fig. 6 of the drawing, I have shown a slight modification whereby the handle portion 11 is made slightly shorter than the handle portion 11 shown in Fig. 1, the head 10 being of the same structure as seen in Fig. 1; and instead of employing a short tube 15, I employ a long tube 17, the lower end of which extends into the groove 13 the same as the tube 15 in Figs. 1 to 5 inclusive. The other end of the tube 17 extends beyond the upper end of the handle portion 11 to form a mouth portion 18. The tube 17 may be a straw of conventional form and construction, and secured in and to the handle portion 11 and head 10 in any desired manner. With this form of construction, it is not absolutely essential to conceal the tubular handle portion 11 to make the same airtight, as the tubular member or straw 17 accomplishes this result.

In Figs. 7, 8 and 9, I have shown another form of spoon comprising a head portion 10$^a$ and a handle portion 11$^a$, the head portion having on its rear or bottom face a groove 13$^a$ similar to the groove 13. The handle portion 11$^a$ instead of being circular in cross sectional form is arc-shaped or substantially semi-circular in cross sectional form as seen in Fig. 8 of the drawing, and said handle portion is integral with the head portion 10$^a$. In completing the construction of the handle portion 11$^a$ to provide a bore or passage extending therethrough, I employ another member 18$^a$ which may be termed a supplemental handle member which is also semi-circular in cross sectional form and seats within the handle members 11$^a$ in the manner seen in Fig. 8 of the drawing. Said parts are secured together to form a sealed bore or passage 19 to permit the transmission of fluid therethrough. The member 18$^a$ extends into the groove 13$^a$ as seen at 20 in order to extend the bore 19 to the lower end of said groove, and the lower end portion of the head 10$^a$ of the spoon. In the construction shown in Figs. 7, 8 and 9, the parts 10$^a$ and 18$^a$ may be composed of similar material or of different material, it being understood that the part 11$^a$ or main handle member will be of sufficient strength and rigidity to provide a spoon which may be used practically for the purpose intended.

It will be understood that while I have shown certain details of construction for carrying my invention into effect, that I am not necessarily limited to these details, nor to any specific type of material employed in the construction of the spoons, and various other changes in and modifications of the construction herein shown and described, may be made within the scope of the appended claims, without departing from the spirit of my invention or sacrificing its advantages.

Having fully described my invention, what I claim as new and desire to secure by Letters Patent, is:—

1. A spoon of the class described comprising integral head and handle portions formed from rigid fibrous material, the handle portion extending onto the head portion in the form of a rib providing a groove on the underface of the head portion, said handle portion being tubular in form to provide a passage therethrough, and means for extending said passage to the lower end portion of the groove in said head.

2. A spoon of the class described comprising integral head and handle portions formed from rigid fibrous material, the handle portion extending onto the head portion in the form of a rib providing a groove on the under face of the head portion, said handle portion being tubular in form to provide a passage therethrough, means for extending said passage to the lower end portion of the groove in said head, and said means comprising a member extending longitudinally of and within the handle portion.

3. A spoon of the class described comprising integral head and handle portions formed from rigid fibrous material, the handle portion extending onto the head portion in the form of a rib providing a groove on the under face of the head portion, said handle portion being tubular in form to provide a passage therethrough, means for extending said passage to the lower end portion of the groove in said head, said means comprising a member extending longitudinally of and within the handle portion, and being tubular in form and extending beyond the upper end of the handle portion.

4. A spoon of the class described, the head and handle portions of which are of stiff, fibrous material, the handle portion where it joins the head portion extending in a rib forming a groove on the under face of the head portion, and said handle portion being tubular in form.

5. A spoon of the class described, the head and handle portion of which are of stiff, fibrous material, the handle portion where it joins the head portion extending in a rib forming a groove on the under face of the head portion, said handle portion being tubular in form, and a member mounted in the handle portion and extending into the groove of the head portion to extend the bore of the handle portion to the lower end of the groove in the head portion.

6. The combination with a spoon composed of fibrous material and comprising a tubular handle portion with a spoon head at one end thereof, of a straw mounted in the handle portion and extending beyond said handle portion onto the rear face of the head portion and forming a passage through and extending beyond said handle portion onto the head portion.

In testimony that I claim the foregoing as my invention I have signed my name this 28th day of December, 1926.

MAX NORMAN.